3,358,004
BIFUNCTIONAL PHOSPHORUS-
CONTAINING AZIDES
Arthur D. Bliss, Guilford, and Rudi F. W. Rätz, Hamden,
Conn., assignors to Olin Mathieson Chemical Corporation, New Haven, Conn., a corporation of Virginia
No Drawing. Filed Oct. 21, 1965, Ser. No. 500,263
2 Claims. (Cl. 260—349)

ABSTRACT OF THE DISCLOSURE

Bifunctional azides having the following formula

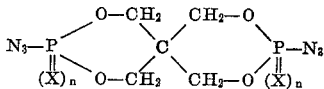

where X is oxygen or sulfur and $n$ is an integer of 0–1 have been prepared by the reaction of the corresponding dichlorides with alkali metal azides in the presence of inert diluents. These new compounds are useful as contact and systemic insecticides and are also valuable as components in polymer formation.

---

This invention relates to a series of bifunctional phosphorus-containing azides, and more particularly it relates to diazides having the following general formula:

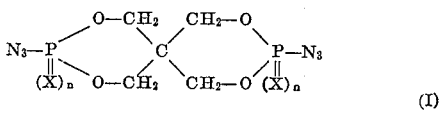

(I)

wherein X is oxygen or sulfur and $n$ is an integer of 0–1.

It has been found that, in accordance with this invention, the bifunctional azides I are provided in high yield and purity by the reaction of the corresponding dichlorides with alkali metal azides in the presence of selected inert diluents. The reactions herein proceed according to the following equation wherein X and $n$ are as previously defined and M is an alkali metal:

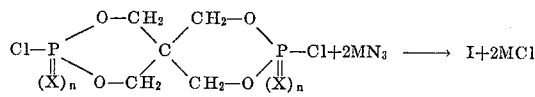

Necessary intermediates for the preparations described herein are: 3,9-dichloro-2,4,8,10-tetraoxa-3,9-diphosphaspiro[5.5]undecane, 3,9-dichloro-2,4,8,10-tetraoxa-3,9-diphosphaspiro[5.5]undecane-3,9-dioxide, and the corresponding -3,9-disulfide. Preparation of the first compound has been disclosed for example by Lucas et al. in J. Am. Chem. Soc., 72, 5491 (1950) wherein pentaerythritol was reacted with phosphorus trichloride. The -3,9-dioxide has been disclosed by Charonnat et al. in Ann. pharm. franc., vol. 10, 666–9 (1952) wherein pentaerythritol was reacted with phosphoryl chloride. Finally, pentaerythritol bis-hydrogen thiophosphite, prepared as disclosed in U.S. Patent 3,210,398, may be conveniently reacted with carbon tetrachloride in the presence of a tertiary amine in dimethylacetamide solution to provide the -3,9-disulfide. Thus the process for the preparation of the diazides I comprises reacting the aforementioned dichlorides with any of the alkali metal azides at a temperature range of about −10° C. to about 75° C. and preferably at 20°–40° C. Although any of the alkali metal azides may be employed, sodium and potassium azides are preferred reactants. An inert diluent is suitably utilized in the process of this invention. As used herein, inert diluent refers to a liquid medium which has some degree of miscibility with both the organic dichloride and the inorganic azide reactants so as to bring them into intimate contact for reaction and yet does not itself react with either of the reactants. Included among the diluents which are suitably employed are acetone, acetone-water mixture, methyl ethyl ketone and liquid sulfur dioxide. Upon completion of the reaction, the solid diazides are conveniently isolated by filtration or centrifugation procedures or by removal of diluent and recrystallization of the solid residue.

The diazides I are valuable agricultural chemicals since they have demonstrated effectiveness as contact and systemic insecticides. The bifunctional azides are also valuable as components in polymer formation. For instance, they react very readily with bifunctional tertiary phosphines with elimination of nitrogen to provide polymers containing the recurring phosphine-imine unit which are characterized by an exceptionally enhanced resistance to deterioration by flame. The diazides I are not subject to explosion initiated by shock or flame which is characteristic of many azide products. However, the tervalent phosphorus product is somewhat more subject to non-explosive decomposition than the pentavalent phosphorus products included in the general Formula I.

The following example will serve to illustrate the preparation of one of the novel diazides of this invention.

Example 1

A mixture of 2.48 g. of 3,9-dichloro-2,4,8,10-tetraoxa-3,9-diphosphaspiro[5.5]undecane-3,9-disulfide and 0.975 g. of sodium azide was treated with 5 ml. of water. Acetone was then added dropwise until a clear solution was obtained. The solution was allowed to stand overnight at room temperature. A small amount of crystalline material deposited. Water was added to complete the precipitation and the solid was filtered, washed with water and dried in vacuum. The dried solid weighed 2.25 g. and melted at 174/6° C., dec. The solid was dissolved in methylene chloride at room temperature and the solution obtained was treated dropwise with carbon tetrachloride to very faint turbidity and left standing overnight at −15° C. Filtration in the cold gave 1.2 g., M.P. 177°–178° C., dec. Following analytical data revealed that 3,9-diazido-2,4,8,10-tetraoxa - 3,9 - diphosphaspiro[5.5]undecane-3,9-disulfide had been obtained. Yield: 80%.

*Analysis.*—Calcd. for $C_5H_8N_6O_4P_2S_2$: C, 17.54; H, 2.35; N, 24.56; P, 18.10. Found: C, 17.58; H, 2.27; N, 24.65; P, 17.91.

What is claimed is:
1. A bifunctional azide having the formula

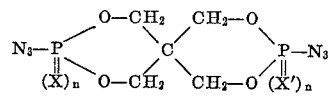

where X is oxygen or sulfur, X' is oxygen or sulfur, with the proviso that X and X' are the same and $n$ is an integer of 0–1.

2. 3,9-diazido-2,4,8,10-tetraoxa-3,9-diphosphaspiro[5.5]undecane-3,9-disulfide.

References Cited

UNITED STATES PATENTS

| | | | |
|---|---|---|---|
| 2,712,026 | 6/1955 | Schrader | 260—349 |
| 3,138,585 | 6/1964 | Rätz | 260—239 |

FOREIGN PATENTS

| | | |
|---|---|---|
| 1,080,108 | 4/1960 | Germany. |
| 1,177,161 | 9/1964 | Germany. |

NORMA S. MILESTONE, *Acting Primary Examiner.*

JOHN D. RANDOLPH, *Examiner.*

C. SHURKO, *Assistant Examiner.*